Oct. 6, 1942.  H. B. SAUNDERS  2,298,023
RADIO ANTENNA
Filed March 27, 1940  2 Sheets-Sheet 1
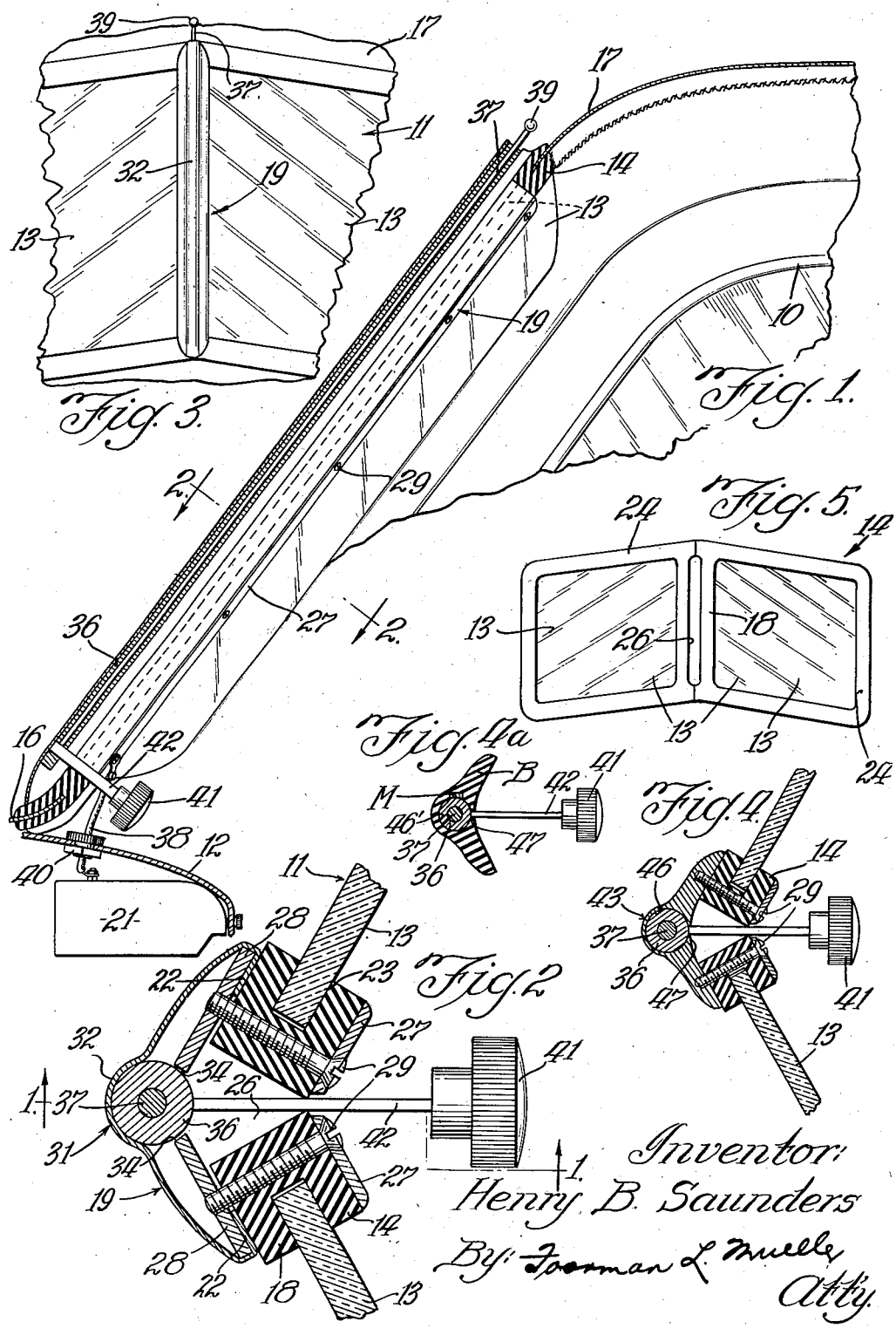
Inventor:
Henry B. Saunders
Atty.

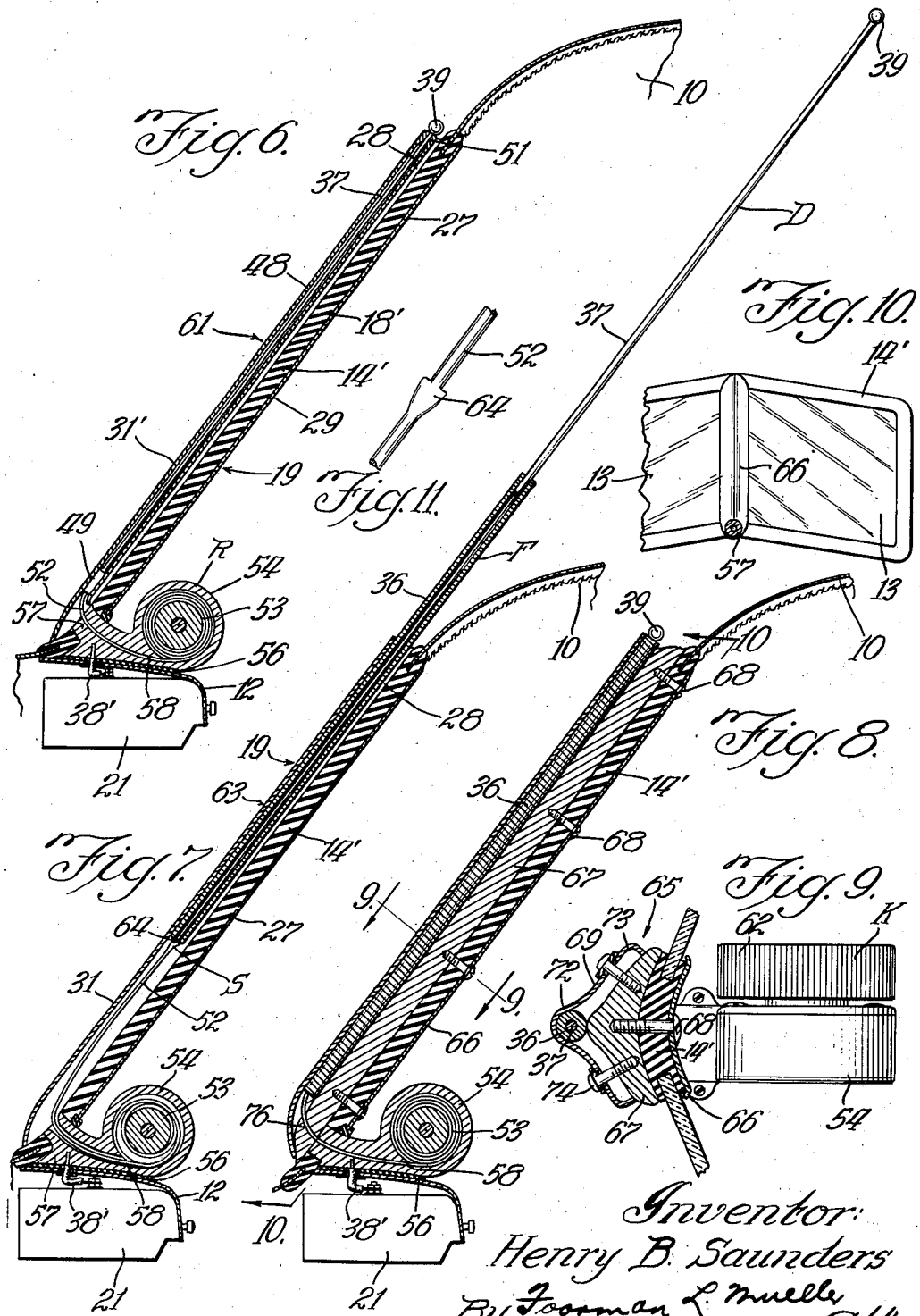

Patented Oct. 6, 1942

2,298,023

UNITED STATES PATENT OFFICE 2,298,023

RADIO ANTENNA

Henry B. Saunders, Chicago, Ill., assignor to Galvin Manufacturing Corporation, Chicago, Ill., a corporation of Illinois Application March 27, 1940, Serial No. 326,238

13 Claims. (Cl. 250—33)

This invention relates in general to radio antenna systems, and in particular to a radio antenna system for an automotive vehicle.

Because of the shielding effect of the metal body and top on an automobile, it is normally necessary, or at least desirable, to mount the radio antenna on the outside of the body or the top. There are disadvantages to the outside mounting, however, because many of the antennae mounted in this manner either require cutting through the metal, and thus possibly defacing the automobile, or they detract from the general appearance of the vehicle because they do not readily blend with the contour of the body and top.

Furthermore, because of space limitations, an antenna for an auto radio is normally too short for the most desirable signal reception. A telescoping antenna extending in an upright direction on an automobile helps to solve this difficulty because it can be extended materially under the most adverse signal pick-up conditions, and yet will provide quite satisfactory pick-up in strong signal areas, at its minimum height. In the latter position it generally is least objectionable from an appearance standpoint. However, there is still the mounting difficulty, and the telescopic parts can only be extended from the outside of the automobile. Again, there has been a partial solution to this disadvantage by devices such as those known as the "disappearing" antenna, which are adjusted from the inside of the car by means of a crank and gear mechanism, or in some cases by vacuum operated means. There is still normally some defacement of the car body, and this "disappearing" type antenna has the further disadvantage of being expensive both in purchase and installation cost, and hence limited in its application.

It is an object of this invention, therefore, to provide an improved antenna system for the radio apparatus of an automobile.

Another object is to provide an antenna system for an automotive radio which is readily adapted for installation on the outside of the car body without in any manner defacing the car body, and is adapted for both original equipment on the car, that is, to be assembled with the car, and for accessory or subsequent installation.

Yet another object of this invention is the provision of a "disappearing" antenna which is assembled on the outside of the car body at the windshield and is adapted for adjustment from the inside of the car body by means located at and extending through the windshield.

A further feature of this invention is found in the provision of a telescopic signal collector which utilizes a part of the car structure as an effective signal collecting portion thereof.

A still further object is the provision of a "disappearing" antenna, adjustable from the inside of a vehicle, and yet which is inexpensive in cost, of simple and rugged construction, and is efficient in operation.

Another object of this invention is the provision of a "disappearing" antenna which is assembled on the outside of the car body, but is substantially concealed in a manner so as not to detract from the appearance of the car.

A feature of this invention is that it provides an antenna of the "disappearing" type for automobiles equipped with a split or V-type windshield comprised of two glass sections, and is adapted to utilize the metal frame structure of the windshield as an effective signal collecting portion. The collapsible portion is supported on the frame structure between the glass sections of the windshield, and the entire antenna structure is insulated from the automobile body.

Another feature of the invention is that it provides the antenna at a position very near the usual mounting place for an automobile radio at the fire wall or dashboard of the automobile, thus necessitating only a very short antenna-radio connection.

Further objects, advantages, and features of this invention will be apparent from the following description taken in connection with the accompanying drawings in which:

Fig. 1 is a reduced sectional view taken along the line 1—1 in Fig. 2.

Fig. 2 is an enlarged transverse sectional view as seen along the line 2—2 of Fig. 1.

Fig. 3 is a fragmentary view showing in reduced size the complete assembly of the signal collector of Fig. 1 as it appears from the front of the car;

Fig. 4 is a modified embodiment of the invention, illustrated similarly to the structure of Fig. 2;

Fig. 4a is a fragmentary sectional view of another modification illustrated similarly to the structure of Fig. 4;

Fig. 5 is a front detailed view in reduced size showing one form of a frame or casing for the windshield, provided in insulating material and adapted for use with the signal collectors of Figs. 2, 4 and 4a;

Figs. 6, 7 and 8 are further modified forms of

Fig. 9 is an enlarged sectional view taken along the line 9—9 in Fig. 8;

Fig. 10 is a reduced view partly in section taken along the line 10—10 in Fig. 8, showing the location and size of the antenna adjusting means relative to the windshield structure, and Fig. 11 is an enlarged detail view showing the driving shoulder on the reelable wire of Fig. 7.

In the drawings, similar parts throughout the several views will be designated by similar numerals of reference. In Figs. 1 and 3, there is illustrated a car body 10 which includes a windshield 11 and dashboard 12. The windshield 11 is of split, or V-type, and is comprised of two similar glass sections 13 which are resiliently mounted in an insulating casing member 14, which is suitably secured in the car body in a well-known manner by engagement with the cowl 16 and top portion 17. The member 14 is normally provided in rubber and in assembling the automobile body 10, is braced or supported at its central portion 18 (Fig. 5) intermediate the glass sections 13, by a suitable metal frame structure, designated as 19. The metal frame structure bears against the rubber member 14 and is completely insulated from the car body 10. The location of the insulated metal frame structure 19 in close proximity to the dashboard 12 brings this portion of the car structure and the extensible antenna portions 36 and 37 supported thereby, to a position near one of the most suitable mounting positions for a radio 21 and renders the entire combination most suitable for a signal collector for such radio.

As seen in Figs. 2 and 5, each glass section 13 is seated in a suitable groove 23 formed within each frame 24 of the casing 14. The casing 14 is preferably of integral construction, the two frame sections 24 thereof, for receiving the glass sections 13, being disposed on opposite sides of the casing central portion 18 which is formed with an opening 26 which extends in length substantially the height of the windshield 11. The central portion 18 acts as a parting strip for the two glass sections 13. The metal frame 19, which supports the central portion 18, and hence the glass section 13, includes vertically slotted bracing or frame members 27 and 28 on opposite sides of the portion 18 and adjacent the opening 26, in a manner to form a slotted opening through the windshield 11. If desired each of the frame members 27 and 28, may be provided as two strips secured in the manner illustrated, and spaced apart laterally so as to correspond with the slotted opening 18. The frame pieces 27 and 28 are suitably secured together through the casing 14 by means of screws 29, the inner-frame pieces 27 being substantially flush with the walls of the opening 26 in the casing 14, and the outer members 28 converging inwardly over the opening 26 for a purpose to be later described.

A bracket or moulding member 31, substantially V-shape in cross-section, and having an arcuate portion 32 at the apex thereof is supported on the outside of the windshield 11 in a manner to completely cover the members 28. Each side of the bracket 31 is formed with an inturned lip or flange 22, which is adapted to fit about an end of the frame pieces 28 so as to be rigidly secured between the frame pieces 28 and the casing 14, upon tightening of the screws 29. The converging ends 34 of the frame pieces 28 are arcuately formed to correspond with the arcuate portion 32 of the bracket 31, the ends 34 and the arcuate portion 32 defining the circumference of a circle. Arranged within the circular space thus defined and slidably supported by the ends 34 and arcuate portion 32, is a flexible tube 36 of coil form, the coils of which are in touching engagement and of sufficient thickness to provide sufficient rigidity in the tube to have it self-supporting over the entire length thereof. The tube is provided in a material which permits the tube to bend easily when in an extended position. Such bending might occur when the car passes under a low overhead and the antenna strikes the same. With the material described the tube will snap back after such bending in condition for telescoping in the member 31.

Slidably positioned within the tubular coil 36 is a flexible rod 37 which is of a length substantially equal to the tube 36. With the rod 37 in its retracted position within the tube 36, and the tube in turn in its retracted position within the bracket 31, it is apparent that the bracket only will be visible on the outside of the car body. The bracket, however, as previously noted, covers only the frame pieces 28 of the frame 19 and normally appears as a part of the car structure of a car having a V-type windshield. The extensible sections 36 and 27 of the aerial 22 are thus mounted on the outside of the car body without detracting in any way from the appearance of the automobile, and when retracted, are substantially completely concealed from view on the car body.

There is thus provided a telescopic signal collector 22 of disappearing type which is comprised of three sections and adjustable for operation in three different lengths, the first section being composed of the frame structure 19 including the bracket or supporting member 31 and the metal members 27 and 28 all in electrical connection through physical contact and the screws 29, the second section including the tubular coil 36, and the third section comprising the rod 37. The antenna circuit of the radio receiver 21 is completed by connection of the signal collector structure, just described, to the radio by the lead-in wire 38. The lead-in wire may be secured directly to the frame structure 19 by one of the screws 29 or any other suitable means. With the set located beneath the shelf of the dashboard 12, the invention provides for the elimination of expensive lead-in cables and a decrease in the losses of the antenna circuit. The short lead-in requires no shielding. When the aerial is installed as accessory equipment, connection of the lead-in wire is readily made by the drilling of a small hole in the dashboard 12 and extending the lead through a decorative bushing 40.

The rod 37 or third section of the signal collector, is adapted for extension from the tubular coil on the outside of the car only, as by pulling upwardly thereon on the ball end 39. The tubular extension 36 is adapted for extensible positioning within the bracket 31 from the inside of the car body 10, by means of an adjusting knob 41. The knob 41 is provided at one end of a shaft or rod 42, which is slidably supported by the casing 14 at the opening 26, and extends between the frame pieces 27 and through the opening 26. The rod is secured to the lower end of the tubular coil 36, as by threaded engagement, welding, or the like. The control knob 41 and rod 42 are thus located within the car body 10 for convenient adjustment by the driver of the car, but in a position away from the car control and out of line of the driver's vision. An up or down movement of the knob 41, as seen in Fig. 1, effects a variation in the extensible length of the tubular coil 36 and hence a variation in the effective length of the signal collector 22. Since the frame members 27 and 38, and opening 26, are substantially coextensive in length with the height of the windshield 11, extension of the tubular coil 36 is limited by the height of the windshield 11. The aerial 22 is thus seen to be doubled in length from the inside of the car body extension of the tube 36 in response to movement of knob 41, and to be tripled in length by an outside actuation of the rod 37.

In the modification illustrated in Fig. 4a there is shown an aerial 22' which is supported in an insulating bracket or moulding B, which is provided in a suitable material such as any of the well-known plastics, or the like. The bracket member B, which is secured to a portion of the car structure, has formed therein a cavity 46' and a slot 47' which extends through a portion of the cavity wall. The tubular coil 36 is slidably supported in the cavity 46' and is extensibly adjustable therein by means of the adjusting knob 41 and connecting rod 42. The rod 37 is slidably supported within the tube 36; the assembly and operation of the adjusting means 41—42, and extensions 36 and 37 being similar to that previously described in connection with Fig. 4. The bracket B is provided with a metal insert M, which is axially positioned in a portion of the cavity wall, so as to be in slidable engagement with the tube 36. The bracket is thus electrically common with the aerial 22' for all operative positions of the tube 36. It is readily apparent that a tubular insert fitted within the cavity 46' and formed with a slotted opening corresponding to the slot 47', could be used instead of the insert M. The insert M may be adapted to operate as an effective signal collecting portion of the aerial 22'. Completion of the antenna circuit is obtained by suitable connection of the insert M with the radio apparatus of the automobile. There is thus provided an extensibly adjusted aerial 22' which is supported in an insulating supporting member B, and adapted for extensible adjustment from the inside of the car body.

The structure of Fig. 4a also has a very practical application as complete antenna structure to be mounted for accessory installation on a metal frame portion of the vehicle. The moulding B itself, serves to insulate the extensible portion from the vehicle body.

The modified embodiment of the invention shown in Fig. 4 differs from the illustration in Fig. 2 only in the construction and assembly of the bracket or supporting member 43. The member 43 is preferably solid, substantially V-shaped in cross-section, and has a longitudinally extending cavity 46 formed in the apex portion thereof. The cavity is in registry along its entire length with the opening 26 in the casing 14, through a slot 47 formed in the wall of the cavity. The tubular coil 36 is slidably supported in the cavity and is extensibly adjusted therein from the inside of the car body 10 by means of the knob 41 and rod 42, which extends between the frame pieces 27 and through the opening 26 and slot 47, for suitable engagement with the coil 36 at the lower end thereof. The rod 37 is slidably supported in the coil 36 in the manner above described in connection with Fig. 2.

The connecting bracket 43 is secured to the casing 14 by means of the screws 29, which also serve to hold the frame members 27 in an assembled position. The bracket 43 reduces the number of parts in the assembly of the signal collector 22 as illustrated in Figs. 1 and 2, by elimination of the frame pieces 28. The bracket may be made of a suitable die-cast material adapted for plating, so as to appear in assembly as part of the frame structure 19. The operation of the aerial of Fig. 4 is apparent from the previous description of Fig. 2.

The signal collector 22 of Figs. 2 and 4 is readily adapted for assembly as either an original or accessory installation by providing the central casing portion 18, and specifically the section thereof defined by the opening 26, with a suitable removable filler material which may be bonded to the casing 14 during the molding thereof. The removable filler section may also consist of the same material as the casing 14 with the bounding edges relatively thin so that it may be cut and readily removed from the central portion 18. Upon installing the antenna system, a frame structure in the same general position of the bracket 31 between the glass sections 13, and originally provided on the car with the windshield 11, is removed so as to expose the casing portion 18. The removable filler in the portion 18 is removed to form the opening 26 and the signal collector is mounted on the windshield 11 in the manner hereinabove explained. Since the frame members 27 and 28 and the frame structure (not shown) which they replace in an accessory installation, are both relatively cheap, this construction of the casing 14 provides for a simple and inexpensive adaptation of the invention to the installation of the signal collector 22 as accessory equipment. It is understood, of course, that for cars having the signal collector 22 as original equipment, the casing 14 will be provided with the opening 26 during the molding thereof.

In Fig. 6 there is shown a further modified form of the invention, in which the windshield 11 includes an insulating casing 14' having a central portion 18' of solid section, and a metal frame structure 19 comprised of frame pieces 27 and 28 and a bracket 31'; the frame pieces 27 and 28, and the bracket 31' being in electrical connection through physical contact and the screws 29 in the manner described in connection with the structure of Fig. 2. The bracket 31' is provided with a longitudinally extending tubular portion 48 which is adapted for slidable engagement with a connecting piston or link 49, which is connected at one end, as by brazing or welding, to the lower end of the flexible rod 37. The rod 37 is retractible within the portion 48 and is guided for extensible movement therein by the link 49 and the shoulders 51 provided near the top of the portion 48. The other end of the link 49 is connected to one end of an operating member or wire 52 which is adapted to move the rod 37; the wire being provided in a stiff yet flexible material, such as piano wire, and adapted to be wound on a reel 53, which is rotatably supported in a housing structure 54. The housing 54 may be provided in metal and is mounted on the dashboard 12, but insulated therefrom by a suitable gasket 56, for a purpose to be hereinafter noted. Integrally formed with the reel housing 54 is a projection or nose portion 57 which extends through the lower part of the windshield 11 at the casing central portion 18'. The projection 57 is formed with a passage 58 for guiding and conducting the wire 52 from the reel 53 for operative connection with the telescoping rod 37. There is thus provided an antenna structure 61 which is comprised of two sections; a fixed section including the housing 54, metal frame 19, and bracket 31' and an extensible section comprising the wire 52 and rod 37. The circuit of the above described antenna system is completed by connection of the housing 54 with the radio 21 by the lead-in wire 38; the housing 54 being electrically common with the antenna structure.

In the extensible adjustment of the aerial 61 the reel 53 is rotated by a finger knob 62 (Fig. 9) in a direction to unwind the wire 52 therefrom. The wire unwound from the reel 53, which serves as an actuating member, pushes the wire through the passage 58 and the tubular portion 48 of the bracket 31', to effect an upward push on the rod 37, to move the rod from its retracted position in the bracket 31; the wire 52 being of sufficient thickness to keep from buckling or twisting in its confining passage. A continued unwinding of the wire 52 from the reel 53 progressively increases the extension of the rod 37 from the bracket 31', until the link 49 engages the shoulders 51 at the top of the tubular portion 48. It is apparent that the extensible movement of the rod 37 may also be limited by a pre-determined length of the wire 52. The link 49 and shoulders 51 co-act for all operative positions of the rod 37 to maintain the rod in substantial axial alignment with the tubular portion 48 so that the rod is always conditioned for telescopic engagement with the bracket member 31'. Retraction of the rod 37 in the tubular portion 49 is obtained in an obvious manner by rotating the reel 53 in a direction to rewind the wire 52, engagement of the ball end 39 with the shoulder 51 defining the limit of its retracted position. There is thus provided an antenna 61 having a single extension 37 adjustable for all operative positions from the inside of the automobile, by means conveniently located on the dashboard and utilizing a normal part of the car structure as an effective signal collecting portion thereof.

In the embodiment of the invention shown in Fig. 7, the support for the double extension of the signal collector 63 is substantially similar to that illustrated in Fig. 2, and includes an insulating casing 14; and a metal frame 19 comprised of metal frame pieces 27 and 28 and a bracket 31. The casing 14' is of solid section between the glass sections 13 of the windshield 11 and provides for an insulating of the metal frame structure 19, from the car body 10. The flexible coil tube 36 is extensibly supported within the bracket 31 and between the bracket 31 and the frame pieces 28 in the manner hereinabove described, in connection with Fig. 2. The rod 37 is adapted for extension from the tubular coil 36 and is of a length to be substantially completely retractable therein. The lower end of the rod 37 is suitably secured to one end of the wire 52, which is operatively associated with the reel 53; the wire and reel assembly, 52—54, being similar to that previously described with reference to Fig. 6. The wire 52 is formed at a pre-determined point thereon with a knob or shoulder 64 (Fig. 11), adapted to engage the lower end of the tube 36 for a purpose to be later described. The knob 64, however, is of a size to readily pass through the passage 58 for winding on the reel 53. The signal collector 63 is thus seen to include two extensible sections 36 and 37 and a fixed section comprised of the bracket 31, the metal frame 19 and the reel housing 54; the antenna circuit being completed by connection of the housing 54 with the radio 21 by the lead-in wire 38'.

In the adjustment of the aerial 63 from a collapsed position, with the tube 36 retracted within the bracket 31 and the rod 37 retracted within the tube 36, the reel 53 is rotated in a direction to unwind the wire 52. This unwinding of the reel 53 causes the wire 52 which is guided in the passage 58 and bracket 31, to push the rod 37 outwardly from the tube 36; the tube 36 remaining in a retracted position in the bracket 31. Extension of the rod 37 from the tube 36 will continue until the shoulder 64 on wire 52 engages the lower end of the tube 36, at which time the rod 37 will be in a completely extended position from the tube 36. Further unwinding of the wire 52 from the reel 53 will effect a movement upward of both the rod 37 and the tube 36; the rod 37 remaining fixed relative to the tube 36 and in its extended position, and the tube 36 being pushed outward from the bracket 31. The wire 52 is adapted to push substantially the entire tube 36 out of the bracket 31, the extended position of the tube 36 being determined by the unwound length of the wire 54 and being such as to provide for a firm support of the tube 36 in the bracket 31. The shoulder 64 is spaced on the wire 52 relative to the top of the tube 36 to provide for a firm support of the rod 37 in its extended position from the tube 36, sufficient engagement between the tube 36 and rod 37, and the tube 36 and bracket 31, respectively, being maintained to provide for a substantial axial alignment of these parts for all operative positions of the extensible sections 36 and 37 to condition the extensions for a ready telescopic engagement.

In collapsing the aerial 63 from its completely extended position, the reel 53 is rotated in a direction to wind the wire 52 thereon. The change in the direction of movement of the wire 52 in response to the actuating reel 53, breaks the engaging relation between the shoulder 64 and the lower end of the tube 36, and effects a retraction or pulling only of the rod 37 within the tube 36, which remains in an extended position from the bracket 31. Upon a complete retraction of the tube 37 in the tube 36, by a continued winding of the wire 52 on the reel 53, the ball end 39 engages the upper end of the tube 37, and further winding of the wire on the reel effects a retraction of the tube 36 in the bracket 31 to its closed position, the rod 37 remaining completely retracted in the tube 36. It is seen, therefore, that the shoulder on the wire 52 acts to extend the tube 36 from the bracket 31, and the ball end 39 on rod 37 to retract the tube 36 within the bracket 31; the extension occurring only after the rod 37 has been completely extended from the tube and the retraction occurring only after the rod 37 has been completely retracted in the tube. There is thus provided a telescopic aerial of disappearing type which includes two extensible sections and a fixed section assembled in a manner to utilize a part of the car structure as an effective signal collecting part thereof, and arranged to provide for a complete operative adjustment of the extensible sections from the inside of the car.

The embodiment shown in Figs. 8 and 9 is particularly adapted for installation on an automobile as accessory equipment. The metal frame structure 65 which may be of the usual type provided as a part of the original car structure, includes an inner frame piece 66 and an outer frame piece 67, which is of solid substantially V-shaped cross section, the frame pieces 66 and 67 being secured together through the insulating casing 14′ by screws 68. The supporting bracket 69 for the aerial structure 71 is of substantially V-shaped cross section and has formed at the apex thereof an arcuate portion 72 which corresponds to the diameter of the tubular coil 36. The sides of the bracket 69 are formed with flanges or lips 73, which maintain a space relation between the bracket and the frame pieces 67, to which the bracket is secured by screws 74. The flanges 73 are of a length sufficient to provide for the slidable positioning of the tube 36 in the arcuate portion 72 and between the bracket 69 and the frame piece 67. The assembly of the extensible sections 36 and 37 in the bracket 69 is believed to be apparent from the description of Fig. 7. It is apparent also that the aerial structure 71 may include only the sections 36 and 37 by suitably insulating the sections from the frame structure 65, or by providing an insulating support for the adjustable extensions 36 and 37 of a construction similar to that previously described in connection with 4a.

In the mounting of the reel frame 54 on the dashboard 12, a small opening is formed in the frame piece 66 and rubber casing 14′ to extend the nose portion 57 through the windshield 11 to provide for the operative connection of the wire 52 with the telescoping member 37. The metal frame piece 67 is formed with an aperture 76 which is in alignment with the passage 58 in the projection 57 to provide a continuous guiding path for the wire 52. It is apparent, of course, that the projection 57 could be entirely positioned within the car on the inside of the windshield and the aperture 76 extended completely through the frame piece 66 and casing 14′ for alignment with the passage 58 in the housing 54. It is essential, however, to satisfactory operation of the signal collector that the wire passages be adapted to suitably guide the flexible wire 52 from the reel 53 to the rod 37 to prevent its buckling or twisting. As shown in Fig. 10 the cross-sectional size of the portion 57 is relatively small as compared to the size of the frame structure 65 so that cutting through the member 66 and casing 14′ is a simple operation and readily performed. It is not necessary, therefore, to remove or replace any of the original frame structure 65 so that the antenna system can be readily and inexpensively installed as accessory equipment in a relatively short time. The adjustment of the aerial 71 is similar to that of the signal collector 63 previously described and illustrated in Fig. 7.

The invention thus provides for a signal collector of disappearing type for automotive receiving apparatus, which is of simple and rugged construction, inexpensive in cost, and especially adapted for installation as original or accessory equipment without in any way defacing the body of the car or detracting from the appearance of the car. The signal collector is readily adjustable for length from the inside of the car by means conveniently located for adjustment by the driver, and out of the line of vision of the driver. Although the invention has been described and illustrated with specific reference to an automobile having a V-type or split windshield, it is to be understood that it may be used on automobiles having a windshield comprised of a single section of glass and a metal frame structure insulated from the body of the car which will support the extensible portion. It is apparent that in the event the metal frame is grounded to the car body, the signal collector may be effectively operated by the use only of its extensible sections as by suitably insulating the extensible sections and the remaining antenna structure from the metal frame. Further, although the invention has been described with specific reference to a signal collector it is to be understood that it may be used for the radio transmitting apparatus of an automobile.

It is to be understood also that only preferred embodiments of the invention have been illustrated and described herein, and that modifications and alterations thereof can be made which are within the scope of the invention as defined by the appended claims.

I claim:

1. In an antenna system for the radio apparatus on an automobile having a body and a V-type windshield comprised of two sections of glass, an insulating casing member extending about each of said glass sections and having an elongated opening formed therein between said sections, metal frame means on said windshield including frame members oppositely disposed adjacent said elongated opening and a substantially V-shaped connecting member located on the outside of said windshield, certain of said frame members extending toward said connecting member, an aerial including said frame means and having a pair of extensible sections, said extensible sections being retractable in said connecting member and slidably supported therein by said certain frame members, one of said sections comprising a self-supporting coil spring and the other section comprising a rod like member slidably supported in said one section, and means located within the body of said car for adjusting said extensible sections relative to said metal frame means, said adjusting means extending between said oppositely disposed frame members and through said elongated opening and operatively connected with said one section.

2. In an antenna system for the radio apparatus of an automobile having a V-type windshield comprised of two glass sections, an insulating casing member extending about said sections and having an elongated opening therein between said sections, metal frame means on said windshield including frame pieces disposed adjacent said elongated opening and a bracing member located on the outside of said windshield between said glass sections, said bracing member having a cavity extending longitudinally therein, with the wall of said cavity having a slot therein for connecting said cavity with said elongated opening, an aerial including said metal frame means and having an extensible section, said extensible section being slidably supported in said cavity, and aerial adjusting means located on the inside of said automobile and operable to move said extensible section relative to the metal frame means, said adjusting means extending through said elongated opening and slot for operative engagement with said extensible section.

3. In antenna apparatus for an auto radio mounted on a vehicle having a windshield and a hollow insulating member extending vertically thereof substantially midway between the ends thereof, including in combination a pair of relatively extensible aerial sections, with one of said sections comprising a self-supporting coil spring slidably supported in said insulating member and extensible therefrom to an operating position, a vertically extending conductor portion arranged in said insulating member in slidable contact with said one section, said one section being yieldable when struck and automatically returnable to said operating position without permanent injury thereto, and said other section comprising a rod supported within said one section and extendable relative thereto, with said one section being in condition for bending and returning to its operating position when said other section is extended therefrom, and an actuating member connected to the lower end of said one section for sliding the same in said insulating member, said actuating member extending through said windshield for operation from within said vehicle.

4. In an antenna system for the radio apparatus of an automobile having a body and a windshield, said windshield having an opening near the bottom thereof, metal frame means on said windshield insulated from said automobile body and including supporting means positioned on the outside of said windshield, a telescopic signal collector having an extensible section and including said metal frame means, said extensible section being slidably supported in said supporting means, and means including a rotatable actuating member mounted inside said automobile body adjacent the bottom of the windshield and a flexible operating member windable on said actuating member and movable into said supporting means for adjusting said extensible section from the inside of said automobile body, said adjusting means extending through said opening with said flexible operating member being in operative connection with said extensible section and adapted to be moved by rotation of said actuating member.

5. In an antenna system for the radio receiver of an automobile having a body, a dashboard and a V-type windshield comprised of two sections of glass, said windshield having an opening formed therein near said dashboard, a metal frame means on said windshield between said glass sections insulated from said automobile body and including a metal bracket member located on the outside of said windshield, a telescopic signal collector having extensible sections of tubular and rod-like form and including said metal frame means, said metal bracket member being formed with a longitudinally extending arcuate portion adapted to slidably support therein said tubular extensible section, with the extensible rod being slidably supported within said tubular section, means insulatingly mounted on said dashboard for adjusting said extensible sections from the inside of said automobile body, said adjusting means including a rotatable actuating member and a flexible driving member adapted to be wound about said rotatable actuating member, said flexible driving member being guided through said opening for operative connection with the lower end of said rod section to extend said rod section from said tubular section when being unwound from said actuating member, and having a shoulder portion formed thereon for engaging said tubular section after the rod section has been completely extended therefrom to extend said tubular section from said bracket member, the rod section on winding of said flexible driving member on said rotatable actuating member, being retracted within said tubular section and having means thereon adapted to engage the tubular section to retract the tubular section within said bracket member, and a connection to said adjusting means from said radio receiver, said adjusting means being electrically common with said signal collector.

6. In an antenna system for the radio receiver of an automobile having a body, a dashboard and a V-type windshield comprised of two sections of glass, metal frame means on said windshield between said glass sections insulated from said automobile body, a metal supporting member in spaced relation with said frame means and located on the outside of said windshield, said windshield having an opening formed therein adjacent said dashboard and through said metal frame means, a telescopic signal collector having extensible sections of tubular and rod-like form and including said metal frame means and supporting member, said supporting member being formed with a longitudinally extending arcuate portion corresponding to said tubular section, said tubular section being positioned within said arcuate portion and slidably supported between said supporting member and metal frame means, with the extensible rod section being slidably supported within said tubular section, means insulatingly mounted on said dashboard for adjusting said extensible sections from the inside of said automobile body, said adjusting means including a rotatable actuating member, and a flexible driving member adapted to be wound on said rotatable actuating member, said flexible driving member being guided through said opening for operative connection with the lower end of said rod section to extend said rod section from the tubular section when being unwound from said actuating member, and having a shoulder portion formed thereon for engaging said tubular section after the rod section has been completely extended therefrom, to extend said tubular section from said supporting member, the rod section on winding of such flexible driving member on said rotatable actuating member being retracted within said tubular section and having means thereon adapted to engage the tubular section to retract the tubular section within said bracket member, and a connection to said adjusting means from said radio receiver, said adjusting means being electrically common with said signal collector.

7. In an antenna system for the radio apparatus on a vehicle having a body, dashboard and a windshield, said radio apparatus being positioned near said dashboard, frame means on said windshield including frame members and a supporting member, said supporting member being insulated from said frame members and located on the outside of said windshield, a telescopic aerial having at least one extensible section and including said supporting member, said supporting member acting to slidably support therein said extensible section, means insulatingly mounted on said dashboard for adjusting said extensible section from the inside of said automobile body, said adjusting means having a housing with a portion extending through said windshield to guide a flexible wire driving member therethrough, a reel, and including a flexible wire driving member windable on said reel extending through said guide portion and windshield for operative connection with said extensible section, and means connected to said adjusting means and extending therefrom for connection to said radio apparatus, said adjusting means being electrically common with said telescopic aerial.

8. In an antenna system for the radio apparatus of a vehicle having a body and a windshield, frame means on said windshield including frame members and a bracket member, said bracket member being insulated from said frame members and located on the outside of said windshield, an aerial including said bracket member and a pair of extensible sections in telescoped assembly, one of said extensions comprising a self-supporting coil spring slidable in said bracket member, and the other of said extensions comprising a rod-like member slidably supported in said first extension, means for progressively adjusting said extensible sections from the inside of the automobile body to raise said first extension with the other extension therein so as to project above said body, said adjusting means being insulated from said frame means and having a portion extending through said windshield for operative connection with said tube of said other extension, and means connected to said bracket member and extending therefrom for connection to said radio apparatus.

9. In antenna apparatus for an auto radio mounted on a vehicle having a windshield and a metal member extending vertically thereof substantially midway between the ends thereof, including in combination a pair of relatively extensible aerial sections, with one of said sections comprising a self-supporting coil spring in slidable contact with said metal member and extendible therefrom to an operating position, said one section being yieldable when struck and automatically returnable to said operating position without permanent injury thereto, and said other section comprising a rod supported within said one section and extendible relative thereto, with said one section being in condition for bending and returning to its operating position when said rod is extended therefrom, and means operatively connected to said one section to slide the same relative to said metal member and having a portion extending through the windshield for operation from within the vehicle, and a movable portion within the vehicle acting on said first portion to move said one section.

10. In antenna apparatus for an auto radio mounted on a vehicle having a windshield and a metal member extending vertically thereof substantially midway between the ends thereof, including in combination a pair of relatively extensible aerial sections, with one of said sections comprising a self-supporting coil spring slidably supported in said metal member and extensible relative thereto, and said other section comprising a rod slidably supported in said spring and extendible therefrom, with extension of said rod from said spring providing for said tube yielding when struck, but returning to its normal operating position so that said rod may be retracted within said spring, and means for extending said aerial sections having a flexible member extending through the windshield for operation from within the vehicle, said flexible member being connected at one end to said rod and having a portion thereof engageable with said spring when said rod is extended from said spring, said flexible member on movement in one direction sliding the rod from said spring prior to moving the spring from said metal member, and a rotatable member within the vehicle acting on said flexible member to successively extend said rod and spring from said metal member.

11. In antenna apparatus including a pair of relatively extensible aerial sections, for an auto radio mounted on a vehicle having a V-type windshield comprised of two glass portions and a vertically extending hollow metal member on the outside of said windshield between said two glass portions, the combination of a rubber mounting extending about said two glass portions with an opening formed therein between said two portions, said metal member being supported on said rubber mounting, one of said aerial sections comprising a self-supporting coil spring slidably supported in said metal member, with the other of said aerial sections comprising a rod slidably supported within said spring, and means for opening said aerial sections from said metal member including a flexible member extending through the opening in said rubber mounting for operation from within the vehicle, connected at one end to the lower end of said rod and having a portion thereon engageable with the lower end of said spring when said rod is extended from said spring, and a reel for operating said flexible member located within said vehicle adjacent said opening, with rotation of said reel in one direction operating said flexible member to extend said rod from said spring prior to the extension of said spring from said metal member.

12. In antenna apparatus including a pair of telescoped aerial extensions for an auto radio mounted on a vehicle having a V-type windshield comprised of two sections of glass, the combination of a rubber mounting for said windshield arranged about said two sections and having a vertically extending elongated opening formed therein between said two sections, a vertically extending hollow member supported on said rubber mounting over said elongated opening and on the outside of said windshield, and having a vertically formed slot therein registering with said elongated opening, with one of said extensions comprising a coil spring slidably supported in said hollow member, and the other of said extensions comprising a rod slidable in said spring, said spring on extension of said rod therefrom being yieldable when struck and returnable to a position such that said rod is retractable therein, and an actuating member connected to the lower end of said spring for sliding the same in said hollow member, said actuating member extending through said slot and elongated opening for operation from within said vehicle.

13. In antenna apparatus for a radio mounted on a vehicle having a body and a windshield with an opening therein, and a hollow metal member extending vertically of said windshield, an aerial including said metal member and a pair of extensible sections in telescoped assembly, with one of said sections comprising a tubular member supported within said metal member, and the other of said sections comprising a rod-like member supported within said tube, means including a rotatable actuating member mounted inside said vehicle body at said windshield opening, and a flexible operating member extending through said opening, windable on said actuating member and movable into said metal member for adjusting said extensible sections from the inside of said vehicle body, said flexible member being inserted at one end of said spring for connection to one end of said rod, with winding of said actuating member in one direction operating said flexible member to extend said rod outwardly from said spring, said flexible member having an enlarged portion thereon spaced from said connection for engaging said one spring end after the rod has been extended therefrom to concurrently move said spring and rod relative to said metal member, with said rod having an engaging portion on the other end thereof engageable with said spring to provide for the successive retraction of said rod into said spring, and said spring into said metal member on winding of said actuating member in an opposite direction.

HENRY B. SAUNDERS.